No. 825,331. PATENTED JULY 10, 1906.
W. H. LOMAS.
APPARATUS FOR SEPARATING LIQUIDS FROM SOLIDS.
APPLICATION FILED JAN. 11, 1905.
3 SHEETS—SHEET 2.
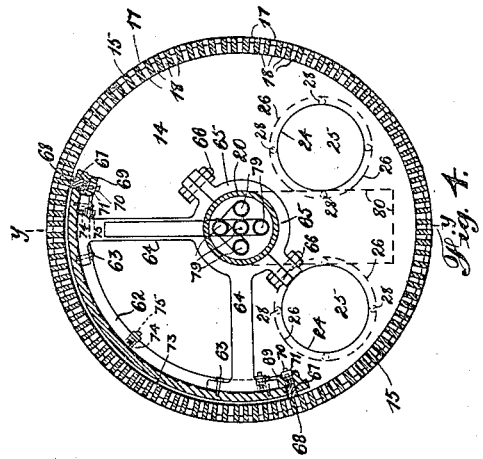
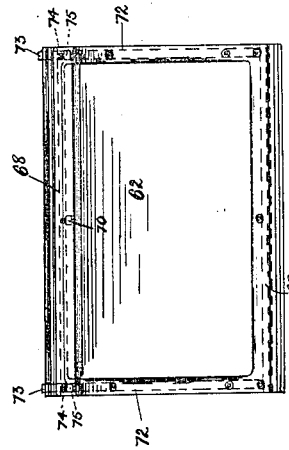
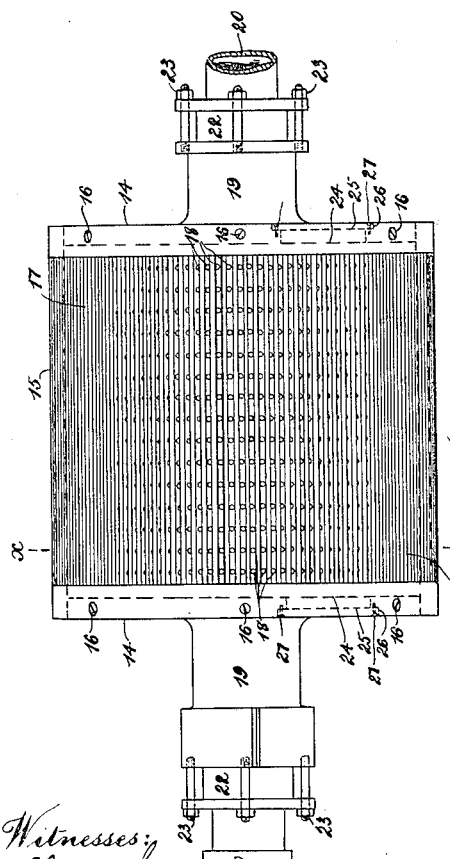
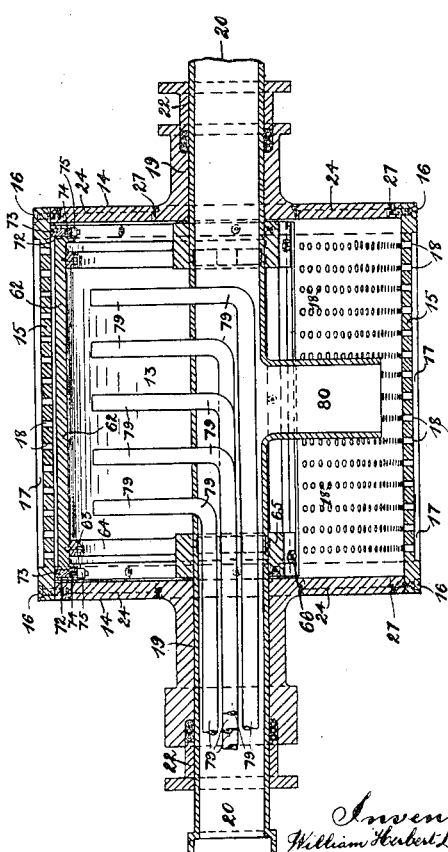

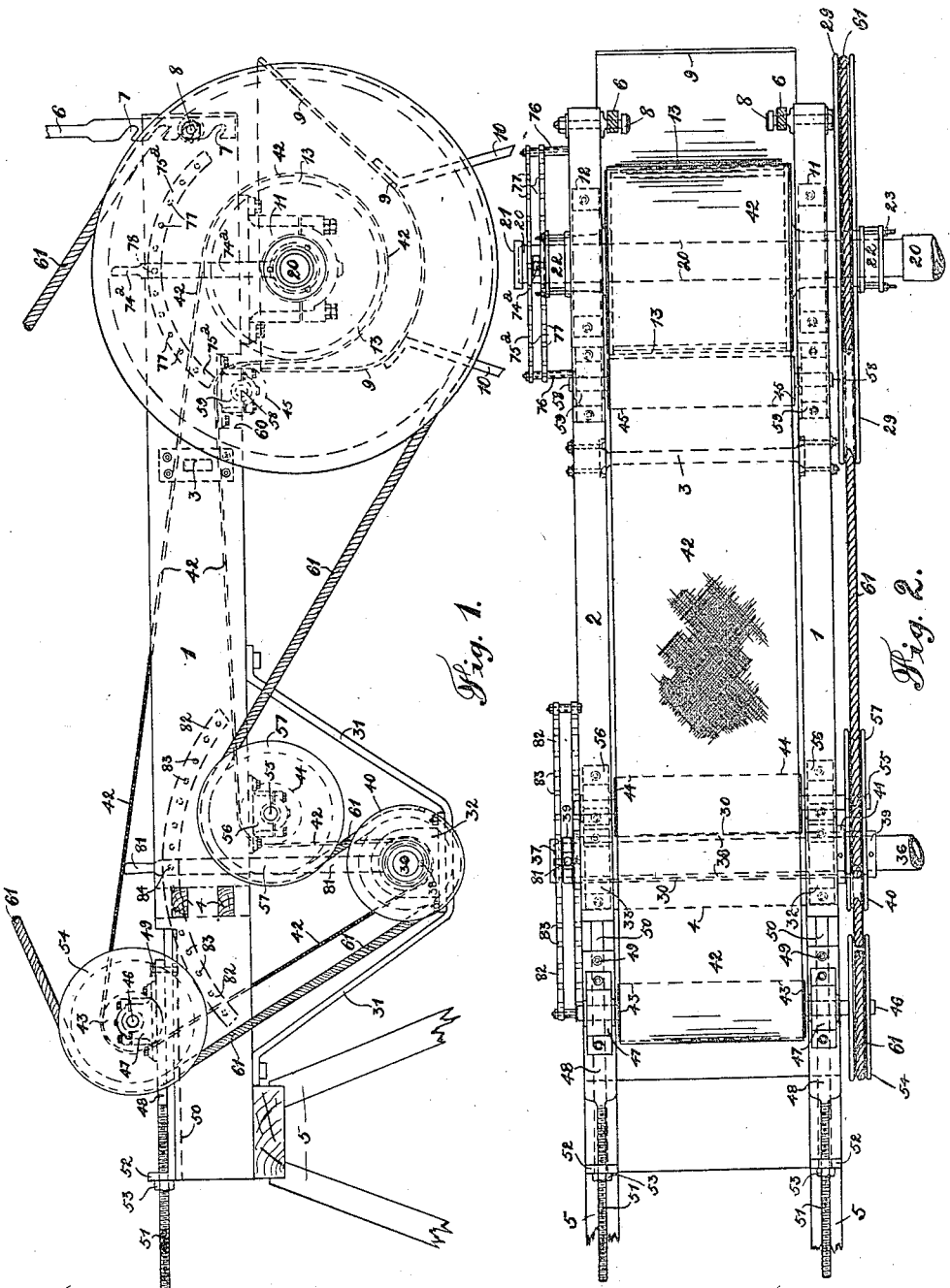

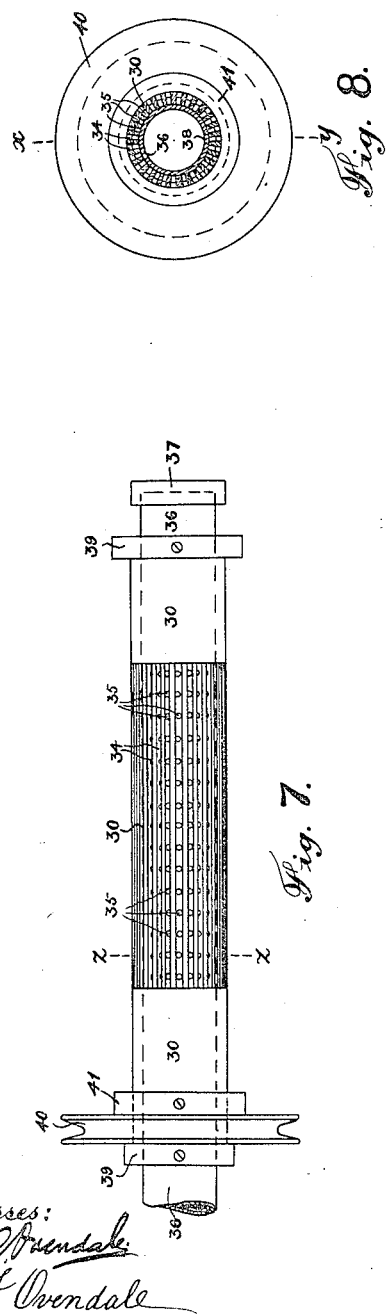
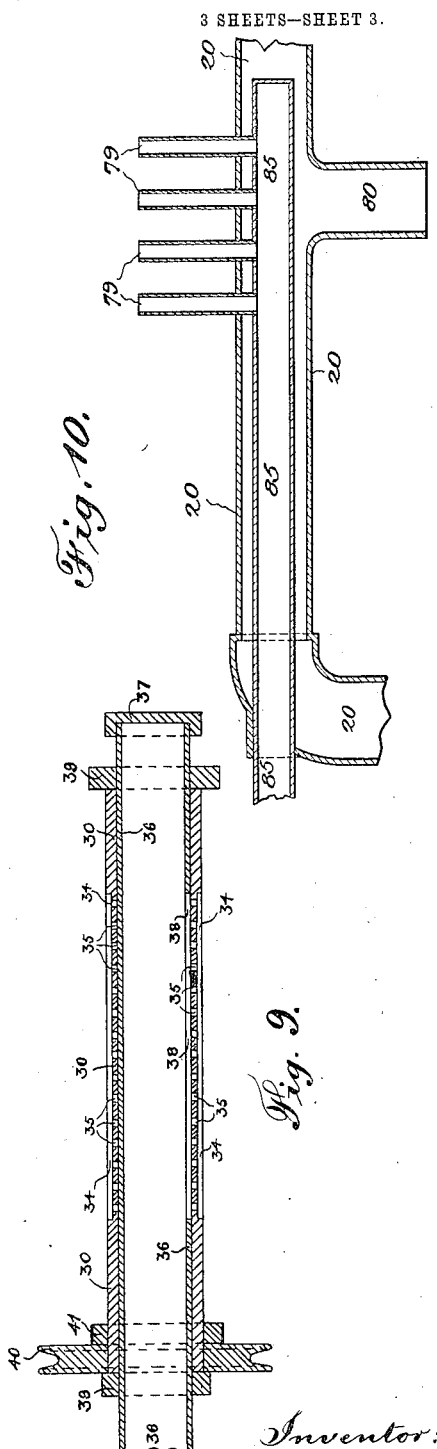

UNITED STATES PATENT OFFICE.

WILLIAM HERBERT LOMAS, OF DOORNFONTEIN, NEAR JOHANNESBURG, TRANSVAAL.

APPARATUS FOR SEPARATING LIQUIDS FROM SOLIDS.

No. 825,331.     Specification of Letters Patent.     Patented July 10, 1906.

Application filed January 11, 1905. Serial No. 240,662.

*To all whom it may concern:*

Be it known that I, WILLIAM HERBERT LOMAS, a subject of the King of England, residing at Doornfontein, near Johannesburg, Transvaal, have invented certain new and useful Improvements in Apparatus for the Separation of Liquids from Solids, more especially intended for use in the treatment of metalliferous ores, of which the following is a specification.

This invention relates to a machine or apparatus designed for effecting the separation of particles of solid matter from liquids in in which they are carried or suspended.

While the machine is suitable generally for separating solids from liquids, it is especially applicable for use in the process of treating auriferous or other metalliferous ores for the recovery of the precious or other metals. In the process of treating such ores it is customary to pulverize the ore and to treat it with cyanid or other solutions to dissolve the precious or other metal and also to apply wash-waters for washing out or removing from the solid matter said solvent solution or solutions.

My invention may be used for the purposes enumerated irrespective of the degree of comminution or the ore or the size of the particles of solid matter. It may be used for treating tailings, sands, or the coarser particles or pulverized ores or for slimes or the finer or more minute particles for extracting or separating therefrom the solvent solutions or wash-waters.

Apparatus embodying my invention comprises an endless porous belt or band, which serves as the filtering medium or surface upon which the solid matter is deposited and from which the separated solid matter is removed and collected. This belt or band is arranged to pass round a perforated suction-drum and round another perforated drum or pipe from which a current of a fluid (gaseous or liquid) passes to displace or remove the deposited solid matter from the surface of the filtering-belt. A suitable arrangement of guide and driving pulleys is provided for directing the belt over or round the greater portion of the circumference of the suction-drum. The suction-drum is preferably arranged to run in a trough or tank in which the mixture of liquid and solid is placed, and the interior of said drum is coupled up or placed in connection with a pump or pumps or other suitable suction or vacuum-creating apparatus for creating a partial vacuum in the drum, so that the liquid portion of the mixture is thereby drawn through the interstices of the filtering-belt into the drum, from which it may be removed by the same or an additional pump or pumps or other suitable apparatus. In the interior of the suction-drum is arranged a damper or device which serves for preventing the ingress of air or liquid around that portion of the circumference of the drum which is not covered by the belt.

To facilitate the fuller description of my invention, I append drawings illustrative thereof, by the aid of which I will at once proceed to describe the construction, arrangement, and operation of the machine in detail.

In the drawings, Figure 1 represents the complete machine in side elevation. Fig. 2 represents it in plan. Fig. 3 is an elevation of the suction-drum removed. Fig. 4 is a transverse section of the drum on line $x\ x$, Fig. 3. Fig. 5 is a longitudinal section of the drum on line $y\ y$, Fig. 4. Fig. 6 is an elevation of the damper, which is arranged inside the drum, as seen from the inside. Fig. 7 is an elevation of the perforated pipe or tube which is employed for displacing the separated solid matter from the belt. Fig. 8 is a transverse section on line $z\ z$, Fig. 7. Fig. 9 is a longitudinal section on line $x\ y$, Fig. 8; and Fig. 10 is a longitudinal section of a modified arrangement of the means which are located in the drum for creating a partial vacuum therein and extracting the separated liquid.

As illustrated in Figs. 1 and 2, the machine or apparatus consists of a frame arranged to carry the several operative parts thereof at a suitable height. This frame is shown comprising two longitudinal and parallel members 1 2 and the transverse members or distance-pieces 3 4, which may be bolted or otherwise securely fixed to the longitudinal members 1 2 and serve to keep the members 1 2 parallel and render the framework rigid. At one end this framework is carried by the legs or supports 5. At the other end the framework is suspended by means of the hangers or supports 6, which latter at their lower extremities are preferably provided with a series of recesses or notches 7. In the ends of the members 1 2 are secured stud-bolts 8, which on the inside are shaped to fit in the recesses or notches 7 in the hangers or supports 6, by which means this end of the frame is adjustably supported.

Below that end of the frame which is supported by means of the hangers 6 and which forms the receiving end of the apparatus is arranged a trough or receptacle 9, which is carried by means of legs or supports 10. The mixture from which the solid matter is to be separated is run into the trough 9 along a launder or pipe or otherwise. The height of the trough 9 is such that it will allow for any adjustment or raising or lowering of the members 1 2 of the frame as may be found requisite in the operation of the machine.

On the under side of the members 1 2 above the trough 9 are bolted or otherwise securely fixed bearings 11 12, in which are journaled the suction-drum 13. The construction of this suction-drum 13 is clearly illustrated in Figs. 3, 4, 5, and 6. It consists of two end disks 14 and the hollow cylinder 15, secured to the disks 14 by means of screws or the like 16. In the external surface or periphery of the cylinder 15 are formed longitudinal grooves, flutes, or recesses 17, and in the bottom of said grooves or flutes 17 are formed holes 18, which communicate with the interior of the cylinder or drum 13. The disks or ends 14 of the drum are formed with bosses which form hollow trunnions 19, on which the drum is free to rotate in the bearings 11 12. Passing through or arranged axially of the drum 13 is a stationary pipe or tube 20. This pipe 20 at the one end is closed by means of the preferably detachable cap or cover 21. In the ends of the trunnions 19 and around the stationary pipe 20 are fitted glands or stuffing-boxes 22, secured by means of the gland-nuts 23, which prevent the ingress of air into the drum 13 or the egress of air or liquid, or both, from the drum 13. In the ends of the drum 13 holes 24 are provided for permitting inspection or access to the interior of the drum 13 from either end. These inspection-holes 24 are closed by means of covers 25, which fit into an annular recess 26, formed in the ends around the holes 24, being secured in that position by means of screws or bolts 27, which pass through holes or slots 28, formed in the ends 14, round the holes 24. The stationary pipe 20 on the one side projects beyond the member 1 of the frame and it is coupled up or connected with any suitable construction of pump or apparatus suitable for creating a vacuum or partial vacuum in the interior of the drum 13. On the end of one of the trunnions 19 is keyed or otherwise securely fixed the driving-pulley 29 for the suction-drum 13. The trough or vessel 9, in which the mixture to be treated is received, is so arranged in relation to the frame that the stationary pipe 20 is below the level of the top of the trough 9, which causes a greater portion of the circumference of the drum 13 to run in the trough 9 and be immersed in the mixture. At or in proximity to the other end of the two parallel members 1 2 of the frame and carried preferably at a lower level than the suction-drum 13 is a perforated pipe, tube, or cylinder 30. This pipe or tube 30 is shown carried by a hanging bracket or other support 31, fixed on the under side of each of the two members 1 2. The brackets or hangers 31 carry bearings 32 33, in which the pipe 30 is journaled at or in proximity to its extremities. The pipe 30 is constructed in a similar manner to the suction-drum 13, in that it is formed with longitudinal grooves, flutes, or recesses 34 and with holes 35, formed at the bottom of said grooves or flutes 34, communicating with the interior of the pipe 30.

Arranged in the pipe 30 is another concentric and stationary tube, pipe, or cylinder 36. This latter pipe 36, at one end, is closed by means of the cap or cover 37, and the other end is placed in communication with a source of supply of air or other fluid (gaseous or liquid) under pressure—as, for example, a pump or like apparatus. The pipe 36 is provided with a longitudinal slot (or slots) the length of which slot 38 corresponds to the perforated portion of the outer pipe 30. The outer pipe 30 is retained in position on the inner pipe 36 by means of collars 39, secured on the inner pipe 36 and abutting the ends of the outer pipe 30. On the extremity of the pipe 30 at the driving side of the machine is keyed or otherwise suitably fixed a pulley 40, which serves for transmitting rotary motion to the outer pipe 30. Between the pulley 40 and the bearing in which the outer pipe 30 is journaled is fixed the collar 41.

Arranged round the suction-drum 13 and the outer pipe 30 is the endless porous belt or band 42, which may be made of canvas or any other suitable textile material of a suitable texture, or of woven wire of a suitable mesh, according to the size of the particles of solid matter contained in the liquid which is to be treated.

For the purpose of guiding the filtering-belt 42 round the drum 13 and perforated pipe 30 and in order to cause it to encompass as much as possible of the circumference of the drum 13 I provide the three guiding-rollers 43 44 45. The one roller 43, which is carried by a spindle 46, is located above the frame and above the level of the top of the drum 13, so that the belt 42 as it leaves the drum and travels up to the roller 43 rises gradually. The spindle 46, carrying the roller 43, runs in bearings 47, which latter are bolted or otherwise securely fixed to slippers or plates 48, which are adapted to slide on the upper edges of the two parallel members 1 2 of the frame. To guide the plates, a bolt 49 may be fixed to each plate 48 and arranged to project into a slot 50, formed in the upper edges of the members 1 2. The outer ends of the plates 48, carrying the bearings 47, are made in the form of screwed rods 51, and they project through holes formed in lugs 52, provided on the ends of the members 1 2 of the frame. 53 represents nuts which serve for securing the screwed rods 51 in any desired position. By this means the tension of the belt or band 42 may be adjusted as may be required.
By rotating the nuts 53 the plates 48, and with them the bearings 47 and roller 43, may be moved in either direction, according to the direction of rotation of the nuts 53. The spindle 46 projects beyond the bearing 47 at the driving side of the machine and has keyed or otherwise fixed to it the pulley 54.

The belt 42 after leaving the roller 43 passes round the perforated pipe 30 and then over the roller 44, which latter is carried by means of a spindle 55, running in bearings 56, secured to the under side of the two members 1 2 of the frame. The spindle 55 is also shown provided with a pulley 57 on the driving side of the machine.
The belt 42 passes from the roller 44 in a horizontal or approximately horizontal direction to the roller 45. This latter roller 45 is fitted with a spindle 58 and runs in bearings 59, provided in recesses 60, formed in the under side of the two members 1 2 of the frame and serves for directing the belt 42 round the suction-drum 13 inside the trough 9. It is preferably arranged, as shown, so that the belt encompasses the greater part of the circumference of the drum 13.

The machine may be driven by any of the pulleys 54, 57, 40, or 29 by means of the rope or belt 61, which passes round the pulley 54, then under the pulley 40 and over the pulley 54, and round the large pulley 29, from which it may be passed direct to the pulley 54, or if the machine is not driven through the medium of any of the pulleys 54, 57, 40, or 29 then over another pulley which serves as the driver.
In the interior of the suction-drum 13 is arranged a damper or curved plate 62, which is fixed, by means of the screws or bolts 63, to the radial arms 64, which latter are firmly clamped or otherwise secured by the clamp 65 and bolts 66 to the stationary pipe 20 inside the drum 13. The damper or curved plate 62 is of such a size as to cover or span that portion of the interior of the drum 13 which is not encompassed or covered by the belt or band 42. Along its two parallel edges the damper 62 is formed with slots 67, in which are located bars 68, which along their outer edges abut the inner periphery of the drum 13. Holes 71 are formed in the slots 67, in which bars 68 are placed, in which holes are arranged spiral springs 69, which serve for keeping said bars 68 pressed against the inner periphery of the drum. To allow the tension of the springs 69 to be adjusted as may be required, plugs 70 are provided which screw from the inside of the damper 62 into the holes 71, communicating with the slots 67, in which the bars 68 are located. In the other two and curved edges of the damper 62 are formed slots 72, in which are also located similar bars 73, provided with springs 74 and adjusting-plugs 75. These bars 73 abut the inner periphery of the drum 13 on the inside of the disks 14 or beyond the perforations. The four bars 68 73, fitted in the four edges of the damper 62, prevent the ingress of air into the drum or the egress of any of the liquid or air through that portion which is not encompassed by the belt or band 42.

To provide for any desired adjustment of the damper 62 in the interior of the drum 13, a lever 74$^a$ is fixed on one end of the outlet-pipe 20, which lever 74$^a$ works in a quadrant 75$^a$, fixed, by means of brackets or bolts 76, to the member 2 of the frame. The lever 74$^a$ works between the two plates of the quadrant 75$^a$, which latter are formed with a number of coincident holes or perforations 77. The lever 74$^a$ is also formed with a hole 78, which may be brought into coincidence with any of the holes 77 and secured therein by means of a pin. This allows the damper 62 to be adjusted from the outside to place it in proper position to close to the interior of the drum 13 the perforations 18, which are not encompassed or covered by the belt 42.

Inside the drum 13 and communicating with the interior of the outlet-pipe 20 are a number of pipes 79. These pipes 79 pass through the outlet-pipe 20 into the interior of the drum 13 and are carried up to the top of the drum 13. At their other ends they communicate with the outlet-pipe 20 at any suitable point. These pipes 79 are provided for exhausting or drawing off the air from the interior of the drum 13. The outlet-pipe 20 is also formed with a downwardly-projecting branch 80, which branch 80 communicates with the interior of the drum 13 at or in proximity to the bottom or lowest point. Through this branch 80 the liquid which is separated from the solid matter in the operation of the machine is exhausted or extracted from the drum 13. By means of the pipes 79 the air is exhausted from the drum 13 above the water-level.

To provide for any requisite adjustment of the pipe 36 in order to place the slot 38 in any desired position in relation to the perforated pipe 30 and belt 42, a lever 81 is fixed on the closed end of said pipe 36. This lever 81 works in a quadrant 82, secured to the member 2 of the frame and formed with holes 83, which are adapted to receive a pin which passes through a hole 84 in the lever 81 to fix it in any desired position in the quadrant 82 in a similar manner to the quadrant 75$^a$ provided on the outlet-pipe 20.

In Fig. 10 I illustrate a slight modification in the arrangement of that part of the apparatus which exhausts the air and extracts the separated liquid from the interior of the suction-drum 13. In this case the outlet-pipe 20 is provided with the branch 80 for drawing off the water at or in proximity to the bottom of the drum 13 and an inner pipe 85, fitted with a number of branch pipes 79, which project to the top of the drum 13 and serve for carrying off the air. The pipe 85, which is fitted with the branch pipes 79, does not communicate with the pipe 20, but passes through it and is connected with a separate pump or exhausting apparatus.

The manner in which the machine operates is as follows: The mixture of liquid and solid is charged into the trough or receiver 9, and the frame having been adjusted so that the suction-drum 13 takes up the required position inside said trough 9 motion is imparted to the belt or band 42 through the driving-rope 61 and pulleys 54, 57, 40, and 29. The tension of the belt 42 having been previously adjusted and the slot 38 having been placed in the requisite position to detach the solid matter from the surface of the belt 42, the exhaust apparatus connected with the pipe 20 is now set in motion, and the air thereby extracted from the interior of the drum 13 and a partial vacuum set up therein. The atmospheric air exerting pressure on the surface of the mixture contained within the trough 9 will force through the interstices of the belt or band 42 the liquid portion of said mixture and will cause the deposition on the surface of said belt 42 of the particles of solid matter. At the same time the separated liquid drawn into the drum 13 through the interstices of the belt 42 and through the perforations or holes 18 in the periphery of said drum 13 will be extracted by means of the branch pipe 80 along the outlet-pipe 20, from which the liquid may be taken for any desired treatment or purpose. The belt 42, traveling continuously, carries along on its surface the particles of deposited solid matter in the form of a layer over the roller 43 and then underneath the perforated pipe 30. As the belt 42 passes around said pipe and the latter is rotated the holes 35, formed in the pipe 30, are brought into coincidence with the longitudinal slot 38 in the internal pipe 36. This latter pipe being placed in communication with a source of supply of air or other fluid under pressure, a current is constantly passing through the slot 38 and through the holes or perforations 35 in the pipe 30 and through the interstices of the belt or band 42. The passage of the current of air through the belt 42 displaces the layer or coating formed by the particles of solid matter on the surface of the belt 42, and they may be collected in a vehicle of any suitable construction for removal for further treatment or otherwise. In case a liquid is used—as, for example, a cyanid solution or a wash-water—it flows through the slot 38, through the tube 30, and belt 42 and removes the solid matter in a similar manner to the air-current.

If desired, instead of detaching or removing the solid matter from the surface of the belt 42 by a current of air or water, the two combined may be used. The belt 42 as it leaves the perforated pipe 30 freed of the solid matter then passes over the roller 44 and over the roller 45, round the surface of the suction-drum 13 inside the trough 9.

What I claim as my invention, and desire to protect by Letters Patent, is—

1. Apparatus of the nature indicated, comprising a porous belt or band which forms a filtering medium, and means round which said belt is caused to pass, adapted for drawing the liquid through the interstices of the belt and depositing the particles of solid matter on the surface of the belt, and means for causing a current of air to pass through said belt for removing the deposited solid matter therefrom.

2. In apparatus of the nature indicated the combination of a porous belt or band which constitutes the filtering medium, a perforated cylinder round which said belt is caused to pass, means for exhausting the air or creating a partial vacuum in said cylinder to draw the liquid portion of the mixture through the belt and to deposit the particles of solid matter on the surface of the belt, a further perforated cylinder round which the belt also passes and means for passing a fluid through said perforated cylinder and through the interstices of the belt to remove the deposited solid matter from the latter, as set forth.

3. In apparatus of the nature specified, the combination of an endless porous belt, a hollow perforated cylinder round which said belt is caused to pass, means for creating a partial vacuum in the interior of said cylinder, a further perforated hollow cylinder round which the belt is also passed and means for passing a fluid through the cylinder and belt to remove the deposited solid matter from the surface of the belt, as set forth.

4. In apparatus of the nature indicated, the combination of a receptacle adapted to receive the mixture of liquid and solid to be treated, an endless porous belt, a hollow perforated cylinder arranged to run in the aforementioned receptacle round which cylinder the belt is caused to pass, means for creating a partial vacuum in the interior of said cylinder to remove the liquid from the mixture, a further hollow perforated pipe or cylinder round which the belt is also caused to pass and means for passing a fluid-current from the pipe or cylinder through the belt to remove the deposited solid matter from the surface of the belt, substantially as described.

5. In apparatus of the nature indicated, the combination of a receptacle for the mixture to be treated, a perforated drum or cylinder free to rotate in said receptacle, an endless porous belt or band passing round said drum, means for directing said belt round the greater portion of the circumference of said drum, means for closing the perforations of that portion of the drum not encompassed by the belt, means for creating a partial vacuum in the interior of said cylinder to remove the liquid from the mixture, a further hollow perforated pipe or cylinder round which the belt is caused to pass, and means for passing a fluid-current from the pipe or cylinder through the belt to remove the deposited solid matter from the surface of the belt, substantially as described.

6. In apparatus of the nature indicated in combination, a receptacle into which the mixture of liquids and solids is conducted, a hollow perforated drum or cylinder arranged to run in said receptacle, an endless porous belt passing round said drum, means for causing said belt to encompass a greater portion of the periphery of said drum, a damper arranged within said perforated drum for closing the perforations in that portion of the drum not covered by the belt, means for creating a partial vacuum in the drum to draw the liquid of the mixture through the interstices of the belt and perforations into the drum and for removing the same from the drum, and means for removing the deposited solid matter from the surface of the belt, as set forth.

7. In apparatus of the nature indicated, in combination, a receptacle into which the mixture of liquids and solids is conducted, a frame, a hollow perforated drum or cylinder journaled in bearings carried by the frame, bearings secured to the frame in such a way that the drum is adapted to rotate in the aforementioned receptacle, an endless porous belt or band passing round said cylinder, a guide-pulley for causing said belt to encompass the greater portion of the circumference of said cylinder, a plate located in said cylinder for closing that portion of the perforations in the cylinder not encompassed by the belt, a further perforated pipe or cylinder carried by the frame round which the endless belt is passed, an inner concentric pipe in said perforated cylinder for passing a fluid-current through the perforated cylinder and belt to displace the deposited solid matter, and means for driving the belt, as set forth.

8. In apparatus of the nature indicated in combination, a porous belt or band and a perforated drum or cylinder round which said belt is caused to pass, a stationary damper or curved plate arranged within said cylinder and adapted to close those perforations which are not covered by the belt, said damper having slots along its edges, bars located in said slots for forming a joint with the inner periphery of said drum, and means for keeping said bars pressed against the inner walls of the drum, substantially as described.

9. In apparatus of the nature indicated in combination, a porous belt or band and a perforated drum or cylinder round which said belt is caused to pass, an axially-disposed pipe arranged in said cylinder, a stationary damper or curved plate fixed to the stationary pipe inside the drum or cylinder having grooves or recesses along its edges, bars located in said grooves forming a joint with the inner walls of the drum or cylinder, springs located beneath said bars which operate to keep the bars pressed against the walls of the cylinder, and means for adjusting the tension of said springs and a lever and quadrant for regulating or setting the damper, substantially as described.

10. In apparatus of the nature indicated in combination, a porous belt or band, a perforated drum or cylinder round which said belt is caused to pass, an axially-disposed pipe arranged in said cylinder which serves as the means for drawing off the air and separated liquid from the interior of said cylinder, a stationary damper or curved plate fixed inside the cylinder for closing those apertures not encompassed by the porous belt, means for creating a partial vacuum in the cylinder, a further perforated hollow cylinder round which the belt is caused to pass, a concentric pipe or cylinder in said latter perforated cylinder said concentric pipe or cylinder being provided with a longitudinal slot, means connected with said concentric pipe for forcing a fluid-current through the perforated pipe and belt to displace the solid matter deposited on the surface of the latter, means for regulating or setting said slotted concentric pipe, and means for regulating or setting the damper inside the perforated drum or cylinder, substantially as described.

11. In apparatus of the nature indicated, in combination, a porous belt or band and a perforated drum or cylinder round which said belt or band is caused to pass, a pipe passing into and communicating with the interior of said cylinder at or in proximity to the bottom thereof for drawing off the separated liquid and a pipe communicating with the interior of the cylinder at or in proximity to the top thereof for drawing off the air or creating a partial vacuum within the cylinder, a damper in the cylinder for closing the apertures in the latter which are not encompassed by the belt or band, means for regulating or setting said damper, a further perforated hollow pipe or cylinder round which the belt is caused to pass, an inner concentric slotted pipe or cylinder, means for passing a fluid under pressure from the slotted pipe through the perforated outer pipe or cylinder and the porous belt to remove the deposited solid matter from the surface of the belt and means for regulating or setting said concentric slotted pipe and damper, substantially as described.

12. In apparatus of the nature indicated, in combination, a porous belt or band which forms the filtering medium, a drum or cylinder round which said belt is caused to pass, said drum formed in its periphery with longitudinal grooves or recesses and with holes at the bottom of said grooves or recesses communicating with the interior of the drum, a stationary pipe on which the drum is free to rotate said pipe serving as the means for drawing off the separated liquid, a plurality of pipes arranged in said stationary pipe and communicating with the perforated drum at or in proximity to the top thereof, a stationary damper or curved plate which serves for closing the apertures or perforations in the drum, which are not covered by the belt on the rotation of the drum, a further perforated hollow cylinder or pipe round which the belt is caused to pass, an inner concentric pipe or cylinder formed with a longitudinal slot, means connected with said concentric pipe for passing a fluid-current through the perforated pipe or cylinder and belt to remove the solid matter from the surface of the belt, and means for driving the belt, substantially as described.

13. In apparatus of the nature indicated, in combination, a porous belt or band which forms the filtering medium, a drum or cylinder round which said belt is caused to pass, said drum formed in its periphery with longitudinal grooves or recesses and with holes at the bottom of said recesses communicating with the interior of the drum, a stationary pipe on which the drum is free to rotate said pipe being formed with a branch which communicates with the interior of the drum at or in proximity to the bottom and serving as the means for drawing off the separated liquid, a plurality of pipes located in said stationary pipe and communicating with the perforated drum at or in proximity to the top thereof, a stationary damper or curved plate which serves for closing the apertures or perforations in the drum, arms clamped to the stationary pipe for supporting said damper, bars fitted in the edges of the damper and abutting the inner periphery of the drum, springs for keeping said bars pressed against the walls of the drum, means for creating a partial vacuum in the interior of the drum to draw the liquid portion of the mixture through the belt into the drum and to exhaust it from the latter, and means for removing the deposited solid matter from the surface of the belt, substantially as described.

14. In apparatus of the nature indicated, in combination, a porous belt or band which forms the filtering medium, a drum or cylinder round which said belt is caused to pass said drum or cylinder comprising two ends disks provided with trunnions on which it is free to rotate and with a hollow cylindrical portion in which are formed longitudinal grooves or recesses and holes at the bottom of said recesses communicating with the interior of the drum, a stationary pipe on which the drum is free to rotate, glands for closing the ends of the drum round said stationary pipe, a branch formed on the stationary pipe communicating with the interior of the drum at or in proximity to the bottom through which the separated liquid is withdrawn from the drum, a plurality of pipes arranged within the stationary pipe communicating with the drum at or in proximity to the top for exhausting the air or creating a partial vacuum within the drum, a damper or curved plate for closing those apertures in the drum which are not covered by the belt as the drum rotates, arms and a clamp for fixing said damper to the stationary pipe said damper being formed with grooves along its edges, bars arranged in said grooves and springs located beneath said bars, means for regulating the tension of said springs, said springs serving as the means for forcing the bars against the inner walls of the drum, covers fitted in the ends of the drum to allow of access to the interior of the same, a lever and quadrant for fixing the damper in position in said drum, and means for creating a partial vacuum in the interior of the drum to draw the liquid portion of the mixture through the belt into the drum and to exhaust it from the latter, and means for removing the deposited solid matter from the surface of the belt, substantially as described.

15. In apparatus of the nature indicated, in combination, a porous belt or band which constitutes the filtering medium, a perforated hollow drum or cylinder round which said belt is caused to pass, means located in the drum or cylinder for closing those apertures or perforations which are not encompassed by the belt or band in its passage round the drum, a pipe projected into the drum or cylinder which forms the outlet for the separated liquid, an internal or concentric pipe arranged in said pipe closed at its inner end and constructed with a plurality of branches which communicate with the interior of the drum at the top, said pipe being connected independently of the outlet-pipe with means for exhausting the air from the drum or cylinder, and means for removing the deposited solid matter from the surface of the belt, substantially as described.

16. In apparatus of the nature indicated, in combination, a porous belt or band which serves as the filtering medium, a perforated drum or cylinder round which said belt is caused to pass, means for creating a partial vacuum in said cylinder and for extracting the separated liquid which passes into it, a further pipe or cylinder formed with longitudinal external grooves and with perforations at the bottom of said grooves communicating with the interior of said pipe or cylinder, an internal and concentric stationary pipe or cylinder formed with a longitudinal slot and means for forcing a fluid under pressure into said concentric slotted pipe to displace the solid matter from the surface of the belt and means for adjusting said concentric slotted pipe, substantially as described.

17. In apparatus of the nature indicated, in combination, a frame adjustably supported at one end, bearings at one end of said frame, a trough or receptacle to receive the mixture to be treated arranged beneath said bearings, a perforated hollow drum or cylinder journaled in said bearings and running in the trough or receptacle provided to receive the mixture, bearings carried by the frame at or in proximity to the other end thereof, a further perforated pipe or cylinder journaled in said bearings, a concentric slotted pipe inside said perforated pipe or cylinder, a porous belt or band which is caused to travel over the perforated drums, pipes or cylinders, a damper arranged in the drum which runs in the trough or receptacle for closing the perforations which are not covered by the belt, and means for adjusting the tension of the belt and for imparting motion thereto, substantially as described.

18. In apparatus of the nature indicated, in combination, a frame adjustably supported at one end, a revoluble drum or cylinder carried by the frame, said drum or cylinder having longitudinal grooves and perforations placing said grooves in communication with the interior, a stationary pipe on which the drum is free to rotate said stationary pipe being formed with a branch communicating with the drum at the bottom for drawing off the separated liquid, a plurality of pipes communicating with the drum at the top for exhausting the air, a porous belt or band which passes round the perforated drum, a damper or curved plate carried by the stationary pipe inside the drum which serves to close the perforations not encompassed by the belt, a lever and quadrant for adjusting the position of the damper inside the drum, a roller journaled in the frame in proximity to the drum for guiding the porous belt over the greater portion of its circumference, a driving-pulley fixed to one end of the perforated drum, a revoluble pipe or cylinder carried by the frame at or in proximity to the other end, a concentric slotted pipe in said perforated pipe or cylinder, a lever and quadrant for adjusting the position of said slotted pipe, a pulley fitted on one extremity of said perforated pipe, a guide-roller between said perforated pipe and the perforated drum, revolubly carried by the frame, bearings adjustably carried by the frame and a further guide-roller for the belt journaled in said bearings, and means for driving the porous belt through the medium of the pulleys, substantially as described and shown.

19. In apparatus of the nature indicated, a long frame, a porous belt or band within said frame, means, also within the frame, round which said belt is caused to pass adapted for drawing the liquid through the interstices of the belt and depositing the particles of solid matter on the surface of the belt, and means, comprising a recessed bar and means for engaging any of the recesses of said bar, for adjustably supporting said frame at one of its ends.

In witness whereof I have hereunto set my hand in the presence of two subscribing witnesses.

WILLIAM HERBERT LOMAS.

Witnesses:
  CHAS. OVENDALE,
  R. OVENDALE.